Dec. 9, 1930.  W. L. FAIRCHILD  1,784,623
MOLDING APPARATUS FOR PNEUMATIC TUBES, TIRES AND THE LIKE
Filed Sept. 2, 1925  3 Sheets-Sheet 1
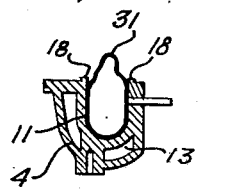
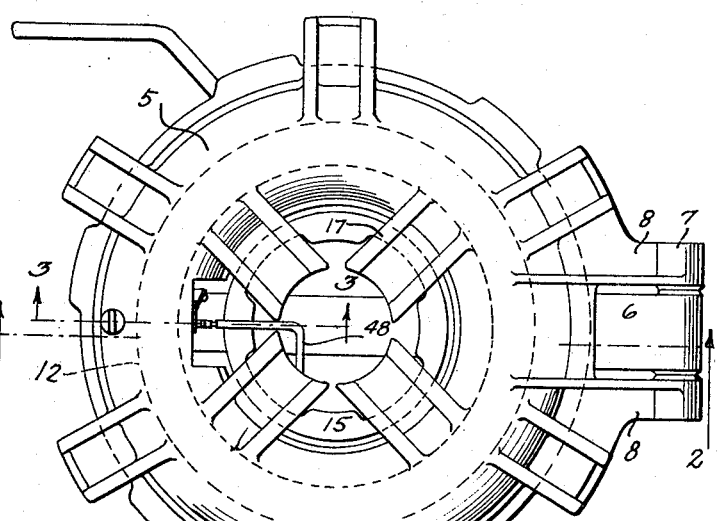
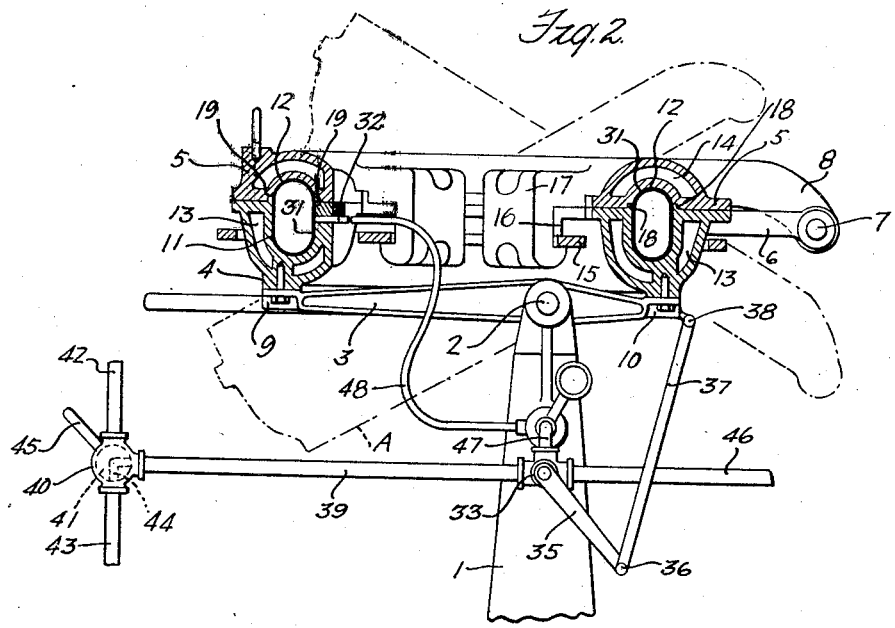
INVENTOR
WALTER L. FAIRCHILD
BY
ATTORNEY Dec. 9, 1930.        W. L. FAIRCHILD        1,784,623
MOLDING APPARATUS FOR PNEUMATIC TUBES, TIRES AND THE LIKE
Filed Sept. 2, 1925        3 Sheets-Sheet 2
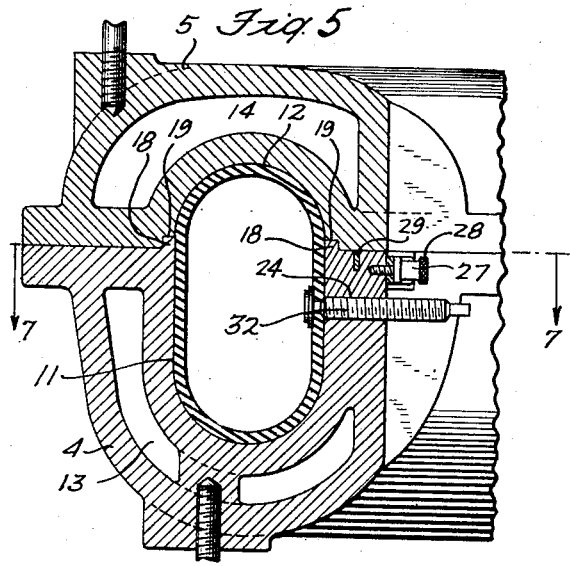
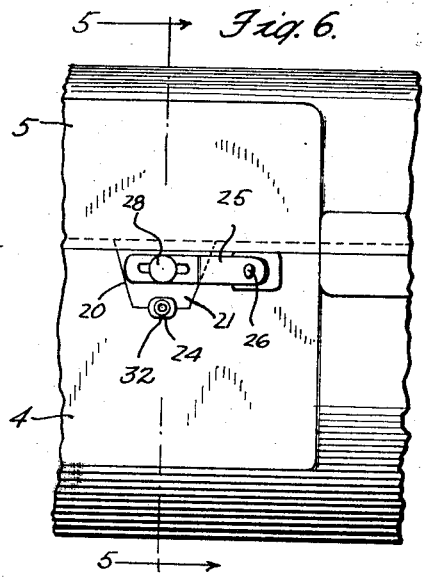
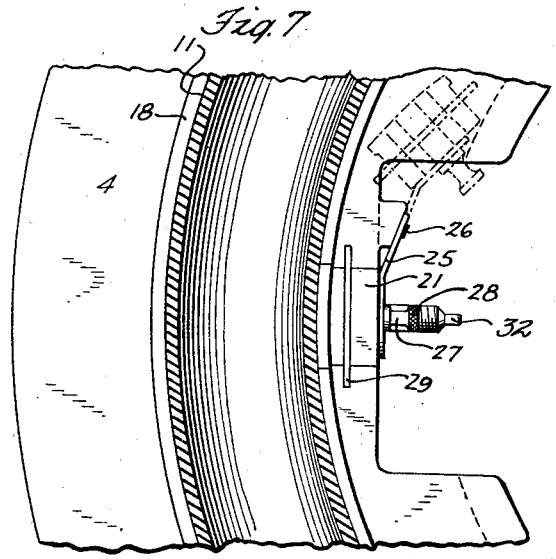
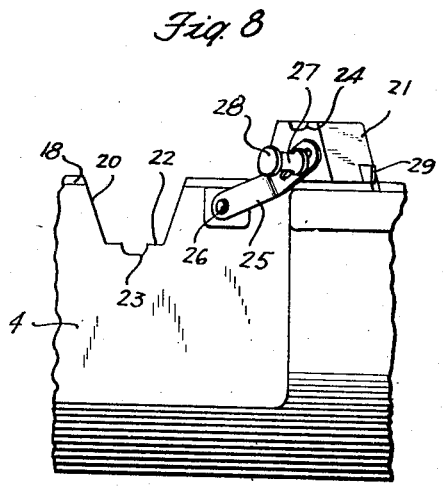
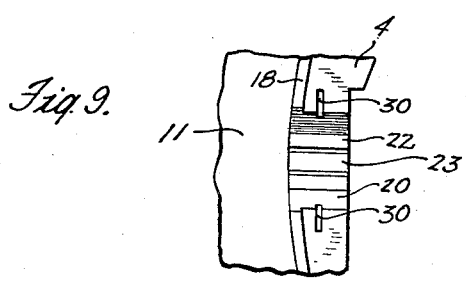
INVENTOR
WALTER L. FAIRCHILD
BY
ATTORNEY

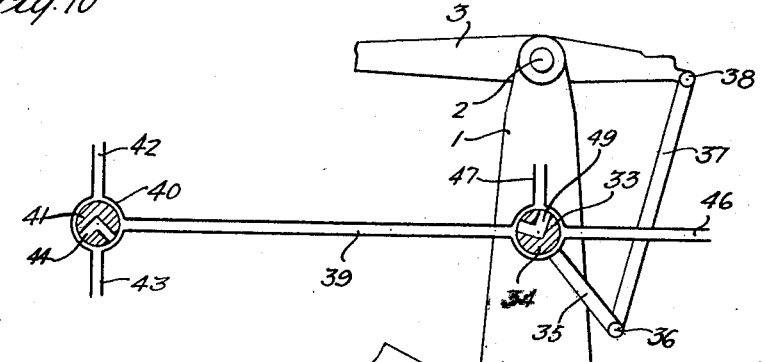
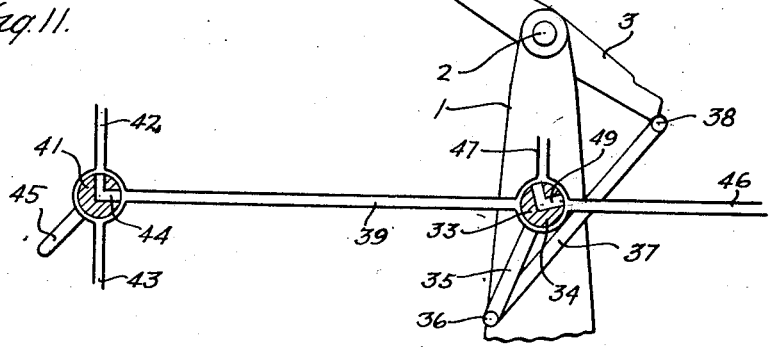
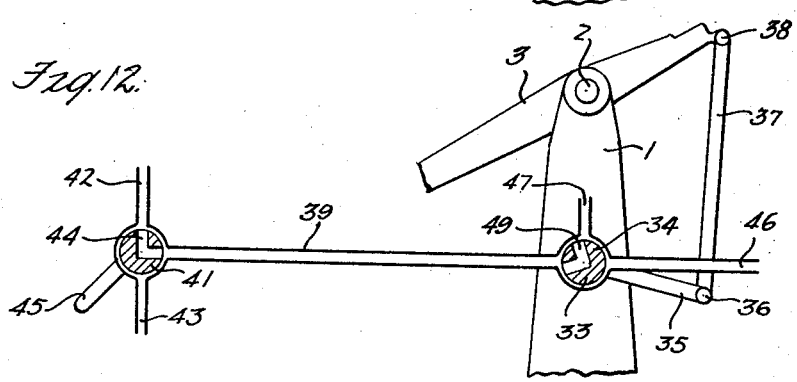

Patented Dec. 9, 1930

1,784,623

UNITED STATES PATENT OFFICE

WALTER L. FAIRCHILD, OF NEW YORK, N. Y.

MOLDING APPARATUS FOR PNEUMATIC TUBES, TIRES, AND THE LIKE

Application filed September 2, 1925. Serial No. 54,054.

This invention relates to a new and improved apparatus for producing pneumatic tubes for vehicle tires, or other hollow articles formed of vulcanized raw rubber compound; the present invention being especially well adapted to carry out the method disclosed in my United States Letters Patent No. 1,597,658, dated August 24, 1926.

One of the objects of the invention is to provide an apparatus through the use of which the cost of producing pneumatic tubes manufactured by present practices may be considerably minimized.

Another object of the invention is to provide apparatus of the above character, whereby pneumatic tubes may not only be produced more economically than obtains in machines as hitherto constructed, but whereby the time of production of such tubes is greatly hastened.

Another object of my invention is to provide apparatus of the above character for vulcanizing pneumatic tubes and the like, whereby the product is more uniform, both as to thickness and texture of the vulcanized wall of the article produced, than are such articles produced by machines as at present constructed.

A further object of the invention is to provide apparatus of the above character, whereby a considerable portion of the operation of the machine is automatic.

A still further object of the invention is to provide a new and improved means for enclosing and locking in the valve stem of the tube or other article to be subjected to the vulcanizing operation.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings, wherein I have illustrated a preferred form of embodiment of my invention:

Figure 1 is a top plan view of my improved vulcanizing apparatus.

Figure 2 is a vertical sectional view taken on the line 2—2 of Figure 1, looking in the direction of the arrow.

Figures 3 and 4 are vertical sectional views taken on the line 3—3 of Figure 1, said views being taken through the lower mold section only, and showing the tube to be vulcanized and inserted within said lower section in different stages of the operation of the machine.

Figure 5 is a vertical sectional view taken through the mold in the vicinity of the valve stem of the tube being vulcanized, said view being taken substantially on line 5—5 of Figure 6.

Figure 6 is an elevational view of that portion of the mold containing a locking device for the valve stem of the tube being vulcanized.

Figure 7 is a horizontal sectional view taken on the line 7—7 of Figure 5.

Figure 8 is a view in perspective, showing the valve stem locking device.

Figure 9 is an elevational view of a portion of the lower mold, showing a detail of construction.

Figures 10, 11 and 12 are elevational views, showing the means employed to control the admission or subtraction of gases employed within the tube to be vulcanized, the parts being shown in their various operative positions in said figures.

Referring now to the drawings, wherein similar reference characters refer to similar parts throughout the various views thereof, the reference numeral 1 denotes the standard or support of the mold, said standard at its upper end having journalled thereon at 2 a beam 3, upon which the vulcanizing mold proper is supported.

The mold consists of two circular sections 4 and 5, the lowermost section 4 having a laterally extending arm 6, to which is pivoted at 7 an arm 8 of the upper section 5, the construction being such that the upper section 5 may be swung upwardly and rearwardly with respect to the lower section 4. The lower section 4 is supported upon opposite sides upon the ends 9 and 10 of the beam 3, the disposition of the point of pivotal support of the beam 3 upon the standard 1 being such that the mold is overweighted upon its forward portion, so that it has a natural bias to swing to the position shown in the dotted outline marked "A" in Figure 2, the normal position of said mold, however, being horizontal, as shown in the full lines of said figures.

The lower section of the mold is provided with a circular vulcanizing channel 11, preferably of oval cross-section, and the upper section is likewise provided with a similar circular vulcanizing channel 12, preferably of oval cross-section, the contour of said channels being such that when the mold sections are placed in the mating relation shown in the drawings, there will be formed a circular vulcanizing chamber of oval cross-section.

The meeting faces of the molds are ground to such a nicety that when the upper section is positioned upon the lower one, a substantially perfect union will be formed between the meeting edges of the vulcanizing surfaces of the respective sections.

The mold sections are adapted to be independently steam-heated, a circular steam chamber 13 surrounding the vulcanizing channel of the lower mold, and a circular chamber 14 surrounding the vulcanizing channel of the upper mold. The connection for supplying the heating medium to the mold sections are not shown in the present drawings, it being understood, however, that said mold sections are connected with a suitable supply of heating medium, such for instance as steam, whereby they will be at all times maintained at a vulcanizing temperature.

The mold sections when in mating relation are adapted to be locked together by a suitable locking device 15, which is interposed between laterally extending lugs 16, upon the lower section, and lugs 17 formed upon the upper section. The details of construction of this locking means are not shown in the present drawings. I prefer, however, to employ such mechanism as is described in my United States Letters Patent No. 1,606,352, dated November 9, 1926.

In order to facilitate the production of a substantially perfect closure between the mold sections, I preferably form upon the lower mold a pair of circular bosses 18, which fit to a nicety within the correspondingly located recesses 19 formed in the upper section. These registering bosses and recesses serve also to register the mating sections and maintain them in perfect registry.

Referring now to Figures 5 to 9 of the drawings, the lower section 4 of the mold, upon its inner edge has formed therein a substantially V-shaped recess 20, which is adapted to receive a similarly shaped block 21. The bottom wall 22 of the V-shaped recess 20 is provided with a flat bottomed depression 23, and the block 21, upon its lower surface, is provided with a flat bottomed recess 24, the construction being such that when the block 21 is positioned in the V-shaped recess 20, an opening adapted to receive the valve stem of the tube to be vulcanized will be formed as clearly indicated in Figure 5, said opening in the present instance being adapted to accommodate the flat sided valve stems usually employed.

Block 21 is carried upon the arm 25, which is pivoted at 26 to the lower section 4 of the mold, the block being adjustably mounted upon said arm as by means of the set screw 27, provided with a handle 28, so that said block may be swung into position shown in Figures 5 and 6, or swung rearwardly to an inoperative position shown in Figure 8.

Block 21 is also provided with laterally extending squared posts 29, adapted to fit in recesses or kerfs 30, formed in the lower section in the vicinity of the V-shaped recess 20. The engagement of the blocks 29 with the recesses 30 serves to lock the block 21 and the lower section against relative lateral movement when the block is moved into operative position.

When the tube, indicated at 31, is positioned in the mold, the valve stem 32 thereof is allowed to fall into the recess 23, whereby when the lock is closed, the valve stem will be completely enclosed, and will project inwardly with respect to the lower section of the mold. The upper surface of the block 21 is, of course, ground so that it will lie flush with the upper ground surface of the lower section of the mold, the block being locked in position by the upper section when it is moved downwardly into engagement with the lower section of the mold.

Referring now to Figures 2, and 10 to 12 of the drawings, I have shown means partly manually, and partly automatically operated, for inserting into the tube to be vulcanized, or removing therefrom, certain gases useful in the carrying out of the vulcanizing apparatus. In these figures the reference numeral 33 indicates the casing of a three-way valve, the valve member being indicated at 34, said valve member in the present instance having a laterally extending arm 35 pivotally connected at 36 with a link 37, which link in turn is connected at 38 with the rear end of the beam 3.

Leading into the valve casing 33 is a conduit 39, said conduit leading from a valve casing 40 of a three-way valve, the valve member of which is indicated at 41. Leading into the valve chamber 40 is a conduit 42, connected with a source of suction, such for instance as a vacuum tank, not shown. Leading also into the valve casing 40 is a conduit 43 which leads from a source of fluid pressure, such as a pressure tank, which may contain air or other gases useful in performing vulcanizing operation, such for instance as carbon dioxide.

The valve member 41 is provided with a V-shaped channel 44, whereby it may be moved to establish connection between either of the conduits 42 and 43 with the conduit 39, or be moved to a neutral position, such as is indicated in Figure 10. The valve member 41 may be operated as by means of a handle arm 45. Leading into the valve chamber 33 is a conduit 46, which is preferably connected with a source of heated gas, such for instance as steam, and leading from the valve chamber 33 is a conduit 47 which may be connected as by means of a flexible conduit 48 (Figure 2) with the valve stem 32 of the tube to be vulcanized.

The valve member 34 is provided with a V-shaped passageway 49, which may be utilized to establish connection between the conduit 47 and either of the conduits 39 or 46.

Having thus described the construction of this embodiment of my invention, the operation thereof may now be understood.

It may first be noted that the tube to be vulcanized, which is formed of unvulcanized rubber compound, is deposited in the lower section of the mold, preferably in a collapsed condition, as indicated in Figure 3, the upper section of the mold having of course been swung upwardly and rearwardly to permit the positioning of the tube within the vulcanizing channel of said lower section. The lower section 4 of the mold when this operation is accomplished, is lying in a horizontal position, as indicated in the full lines of Figure 2, by the position of the beam 3 in Figure 10. With the mold in this position the supply of steam is shut off by the valve 34, and the source of suction and gaseous pressure through the conduit 39 are shut off by the valve 41.

Assuming the parts to be in this position, valve 41 is then operated to force a sufficient quantity of air into the tube, through the conduit 39, the valve chamber 33, and the conduits 47 and 48 to partially inflate the inner tube 31, so that a portion thereof will engage with the heating surfaces of the lower section of the mold. At this point it may be also noted that the mold is divided above centre so that the cross-sectional area of the vulcanizing surface of the lower section of the mold exceeds that of the upper mold, so that the major portion of the tube to be vulcanized lies in the lower section. This construction minimizes the danger of the upper section of the tube falling or lopping over, due to the softening of the rubber compound under the influence of the heat of said lower section of the mold before the upper section can be closed upon the lower section, whereby certain portions of the tube might be pinched between the mating surfaces of the mold, thereby destroying the tube.

It may also be of advantage here to note that I preferably employ air or gas in this relation in a relatively cool condition, whereby to deter the starting of the vulcanizing operation on the tube before the upper section has been placed in position thereon, and the tube expanded within the vulcanizing chamber.

Assuming the parts to be in the position shown in Figure 4, the upper section is swung downwardly and forwardly into position upon the lower section, whereupon valve 41 is again operated to connect the conduit 43 with the conduit 39, thereby projecting a further quantity of air into the tube 31, such quantity of air being forced therein, as will expand the tube and cause it to engage through its entire extent with the surface of the vulcanizing chamber. This operation is shown in Figure 2 of the drawings. When this has been accomplished, the valve 41 is again operated to connect the source of suction 42 with the conduit 39, whereupon the air within the tube 32 will be withdrawn, it being my intention to withdraw substantially all the air from tube. A suitable pressure gauge, not shown, attached to the vacuum apparatus will, of course, show when this point has been attained. Valve 41 is then moved to the neutral position shown in Figure 10.

The mold assembly is then tipped rearwardly as indicated in Figure 11, thereby establishing communication with the steam conduit 46 and the tube being subjected to the vulcanizing process, through the valve member 34, and the conduits 47 and 48. This steam or other gaseous vulcanizing fluid is, of course, heated to the vulcanizing temperature and is maintained within the tube being vulcanized during the vulcanizing period, which will, of course, vary in accordance with the nature of the raw rubber composition, and the particular vulcanizing temperature being employed.

When the vulcanizing operation has been completed, the mold assembly is swung rearwardly and downwardly as indicated in Figure 12. This operation it will be noted will cut off the supply of steam. The valve 41 will then be operated to connect the source of suction through the conduit 42 with the vulcanized tube, whereby the steam and water of condensation will be withdrawn from said vulcanized tube, the tube collapsed, thereby freeing it from the sides of the mold, facilitating its ready removal when the mold sections are separated.

It will accordingly be seen that I have provided a construction well adapted to attain, among others, all the ends and objects above set forth in an extremely facile manner. Pneumatic tubes produced by this apparatus are seamless, and of uniform thickness and texture. Moreover, the construction of the apparatus is such that great economy is effected in the production of pneumatic tubes, by reason of the fact that the operation is semi-automatic, a minimum expenditure of time is required in positioning the tubes within the mold, or removing them therefrom, and that a fewer number of "seconds" are produced than obtains in machines as hitherto constructed.

It will be noted that the valve stem of the tube being vulcanized is locked securely in the recess formed between the lock and the bottom wall of the V-shaped recess in the inner wall of the lower mold section, so that no strain will be put on the pneumatic tube within the vicinity of the anchorage of the valve stem during the operation of connecting or disconnecting said valve stem from the flexible conduit employed to apply suction or pressure to the unvulcanized tube. In the present instance it will be noted that the contour of the aperture formed between the wall of the V-shaped recess and the block which fits therein is such that flat sided valve stems will be held against rotative movement by their engagement with the similarly formed walls of the recess.

It will be understood that various changes may be resorted to in the form, construction and arrangement of the several parts without departing from the spirit and scope of my invention; hence I do not intend to be limited to the details herein shown and described except as they may be included in the claims.

Having thus described my invention what I claim as new and desire to secure by Letters Patent is:—

1. In apparatus of the class described, in combination, a mold comprising a pair of mating sections having complementary vulcanizing channels, said mold sections when positioned in mating relation forming a continuous circular vulcanizing chamber adapted to receive a tube to be vulcanized, means for mounting said mold assembly so that it can swing upon a horizontal axis, means for introducing a fluid into the tube within said vulcanizing chamber to expand it within said vulcanizing chamber, means to suck said fluid from said tube when the latter has been expanded within the mold, and means for automatically introducing a vulcanizing gas into said tube when the mold assembly is moved upon its horizontal axis.

2. In apparatus of the class described, in combination, a mold comprising a pair of mating sections having complementary vulcanizing channels, said mold sections when positioned in mating relation forming a continuous circular vulcanizing chamber adapted to receive a tube to be vulcanized, means for mounting said mold assembly so that it can swing upon a horizontal axis, means for introducing a fluid into the tube within said vulcanizing chamber to expand it within said vulcanizing chamber, means to suck said fluid from said tube when the latter has been expanded within the mold, means for automatically introducing a vulcanizing gas into said tube when the mold assembly is moved upon its horizontal axis, and means for automatically sucking said vulcanizing gas from said tube when said mold assembly is moved in a contrary direction upon its horizontal axis.

3. In apparatus of the class described, in combination, a mold comprising an upper and a lower section, each of which is provided with a vulcanizing channel, said channels when the mold sections are moved into mating relation forming a circular vulcanizing chamber, means for pivotally supporting the lowermost mold section, means for pivotally connecting said mold sections, said vulcanizing chamber being adapted to receive a tube to be subjected to a vulcanizing process, means for introducing air or like gas into said tube to expand it within the mold, means for thereafter withdrawing a quantity of said air or like gas from said expanded tube, means for introducing a heated vulcanizing gas into said tube when said mold assembly is moved in one direction upon its pivotal support, and means for withdrawing said vulcanizing gas from said tube when said mold assembly is moved in an opposite direction upon its pivotal support.

4. In apparatus of the class described, in combination, a mold comprising an upper and a lower section, each of which is provided with a vulcanizing channel, said channels when the mold sections are moved into mating relation forming a circular vulcanizing chamber, means for pivotally supporting the lowermost mold section, means for pivotally connecting said mold sections, said vulcanizing chamber being adapted to receive a tube to be subjected to a vulcanizing process, means for introducing air or like gas into said tube to expand it within the mold, means for thereafter withdrawing a quantity of said air or like gas from said expanded tube, means for introducing a heated vulcanizing gas into said tube when said mold assembly is moved in one direction upon its pivotal support, and means for withdrawing said vulcanizing gas from said tube when said mold assembly is moved in an opposite direction upon its pivotal support, the operation of both of said last named means being automatically determined by the movement of said mold assembly.

5. In apparatus of the class described, in combination, a plurality of mold sections adapted when placed in mating relation to form a circular vulcanizing chamber fitted to receive a tube to be vulcanized, a recess formed in one of said mold sections fashioned to receive a valve stem of said tube, and a locking block mounted to swing on one of said sections for movement into and out of said recess for locking the valve stem in position, said block having lateral projections, and said section having additional recesses adapted to receive said projections, whereby the block, when in locking position, is held against radial movement with respect to the section.

6. Molding apparatus of the class described comprising, a plurality of mold sections adapted for relative movement toward each other to bring them into mating relation and, when in such relation, to form a circular vulcanizing chamber fitted to receive a tube to be vulcanized, a recess formed in one of said mold sections fashioned to receive a valve stem of said tube and tapered substantially in the direction of the axis of said chamber, and a tapered locking block mounted on one of said sections and arranged to have movement in a direction substantially in line with the axis of said chamber into and out of said recess for locking and releasing the valve stem, whereby the bringing of said sections into mating relation serves forcibly to urge the block to the limit of its locking position and to hold the block in said position.

In testimony whereof, I affix my signature.

WALTER L. FAIRCHILD.